US006371534B1

United States Patent
Olson et al.

(10) Patent No.: US 6,371,534 B1
(45) Date of Patent: Apr. 16, 2002

(54) VEHICLE BODY PANEL WITH CLIP LATCH

(75) Inventors: Jay Harold Olson; Dana Albert Sackfield, both of Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/594,990

(22) Filed: Jun. 15, 2000

(51) Int. Cl.$^7$ .............................................. E05C 19/06
(52) U.S. Cl. ....................................................... 292/87
(58) Field of Search ............................. 292/80, 83, 84, 292/87, 88, 89

(56) References Cited

U.S. PATENT DOCUMENTS

| 5,123,681 A | * | 6/1992 | Kos et al. ...................... 292/87 |
| 5,476,133 A | * | 12/1995 | Torkelson .................... 292/84 |
| 5,571,272 A | * | 11/1996 | Roehr et al. .................. 292/80 |

OTHER PUBLICATIONS

John Deere, "Ten Series Combines", Small Grain Combines, 3 pages, date of publication Sep. 1997, published in U.S.A.
John Deere, "9600 Maximizer Combine", Parts Catalog, date of publication Dec. 1996, published in U.S.A.

\* cited by examiner

Primary Examiner—Stephen Avila

(57) ABSTRACT

A vehicle body panel is rotatable about a lower horizontal axis and has a clip latch at the upper portion of the panel that catches the edge portion of an adjacent stationary panel to trap the edge portion of an adjacent panel between the clip latch and the movable panel. The clip latch has a ramp surface engagable with the adjacent stationary panel to slightly deflect the movable panel away from the stationary panel until the ramp portion has cleared the edge of the stationary panel. The clip latch only locks the movable panel in the closed position, not the open position, so that the panel can be moved from the open to the closed position when standing in a position in which the clip latch can not be reached.

6 Claims, 5 Drawing Sheets

VEHICLE BODY PANEL WITH CLIP LATCH

BACKGROUND OF THE INVENTION

1. Field of the Invention

The present invention relates to a movable vehicle body panel and latch and in particular to a body panel with a clip latch that enables a large panel on a work vehicle, such as an agricultural combine, to be self-latched to an adjacent structure by simply rotating the panel to the closed position.

2. Description of the Related Art

Modern day agricultural combines have multiple body panels to provide an aesthetically pleasing appearance to the vehicle and to direct airflow through the engine radiator as well as to prevent airflow to other areas where dirt carried by the air is undesirable. Many of these panels are movable from closed positions to opened positions to allow access for adjustment and routine maintenance. One example is the John Deere 9610 combine that has a large radiator door on one side that pivots about an upright axis adjacent the front edge of the door. When the door is opened by moving the rear of the door laterally outward, a ladder can be extended from the lower end of the door. The ladder allows an operator to climb to a horizontal platform carried by the door. From there, the operator can step to an engine platform on the combine.

Before stepping to the engine platform, it is first necessary to open an engine access panel to have enough room to step onto the engine platform. The engine access panel rotates rearward about a generally transverse horizontal axis adjacent the bottom of the engine access panel. The engine access panel of the 9610 combine is coupled to an adjacent stationary panel by a slide latch. The slide latch has a plate pivoted to the engine access panel with a slot therein. A stud carried by the adjacent stationary panel extends through the slot in the plate and moves through the slot until the stud reaches a stop formed by the end of the slot. An upturned portion of the slot at the slot end allows the plate to pivot downward when the panel reaches the open position to hold the engine access panel in the open position.

After a service operation has been performed, it is necessary for the operator to release the slide latch before descending the ladder so the engine access panel can be returned to it's closed position. If the operator forgets to close the engine access panel until after the ladder has been returned to the stored position and the operator is beginning to close the radiator door, then the ladder must again be extended and climbed to release the slide latch to close the engine access panel. This is a nuisance for the operator.

SUMMARY OF THE INVENTION

Accordingly, it is desirable to provide a latch for the engine access panel that enables the operator to close the panel while standing on the ground. Thus, when the operator descends the ladder before closing the engine access panel, the access panel can be closed from the ground without once again climbing the ladder to release the latch.

The present invention includes a vehicle body panel rotatable about a lower horizontal axis that has a clip latch at the upper portion of the panel. The clip latch catches the edge portion of an adjacent stationary panel and traps the edge portion of the adjacent panel between the clip latch and an edge portion of the movable panel. The clip latch has a ramp surface engagable with the adjacent stationary panel to slightly deflect the movable panel away from the stationary panel until the ramp portion has cleared the edge of the stationary panel. After the clip latch clears the edge of the stationary panel, the movable panel returns to an undeflected position in which the edge portion of the stationary panel is trapped between the clip latch and the movable panel edge portion. The clip latch only locks the movable panel in the closed position. It does not latch the movable panel in the open position so that the panel can be moved from the open position to the closed position while standing on the ground. There is no need to release a latch to close the movable panel.

When the invention is used in the context of a combine, a radiator door panel along the opposite edge of the movable panel can subsequently be closed and carries a protruding stud that seats within a V-shaped plate on the movable panel to retain the opposite edge of the movable panel in the closed position.

DESCRIPTION OF THE PREFERRED EMBODIMENT

Figure 1:
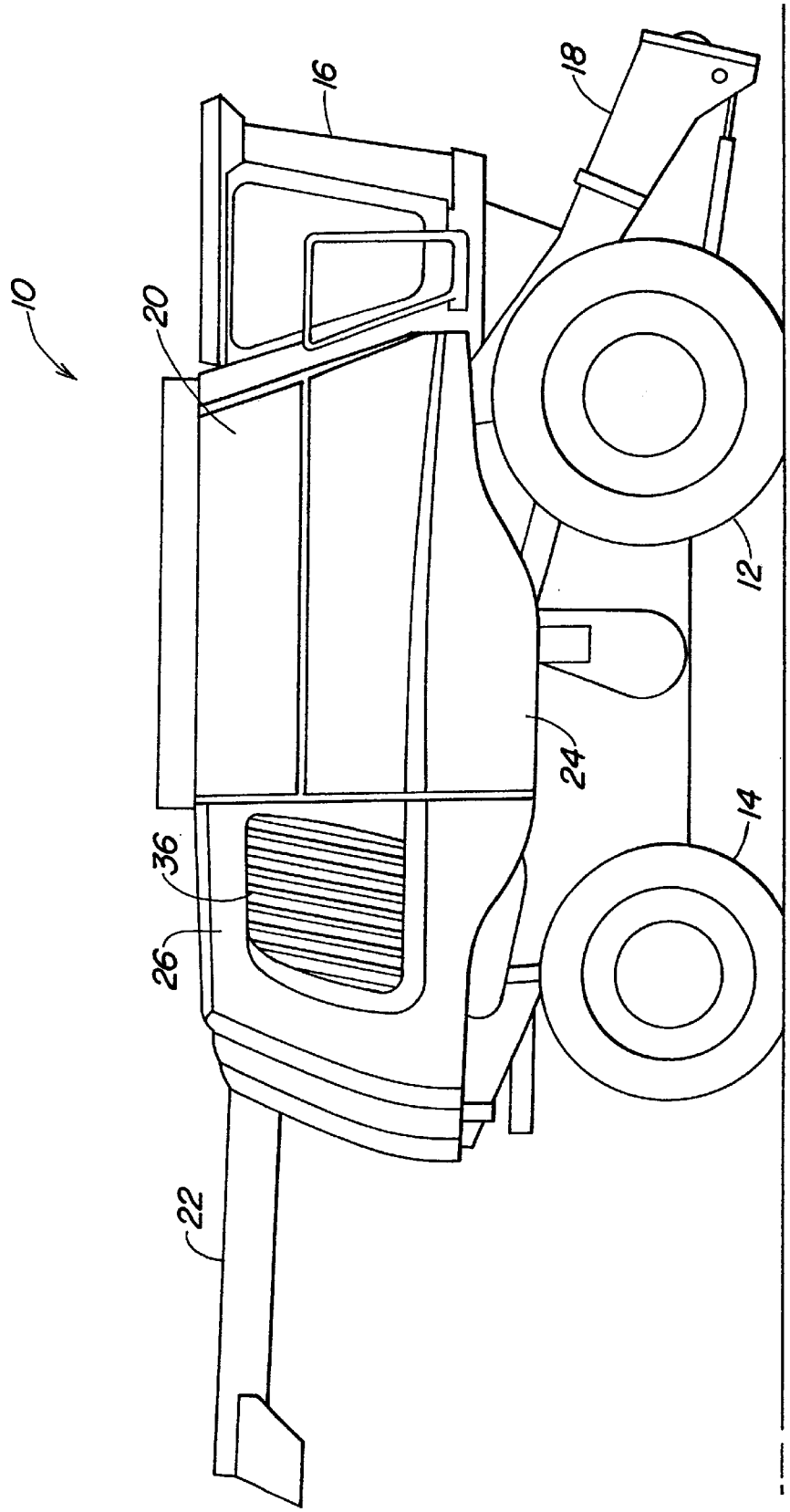
FIG. 1 is a side view of a combine having the movable panel and latch of the present invention.

With reference to FIG. 1, the right side of an agricultural combine 10 is shown. The combine 10 includes front and rear wheels 12 and 14, an operator's cab 16 and front feederhouse 18 through which harvested crop material is fed into the combine for processing. Once processed, the grain is stored in a grain tank 20 and unloaded from the grain tank through an unloading auger 22.

The combine has several body panels (see FIGS. 1–3) including the right side panel 24, a radiator door panel 26, an engine access panel 28, a rear panel 30, left side panels 32 and 34 and front left and front right panels 35, 37. The panels serve various functions including providing the combine with an aesthetically pleasing appearance, directing air flow over certain components, such as by the louvers 36 in the radiator door panel, and preventing airflow elsewhere to keep dust and dirt from various areas of the combine.

Figure 2:
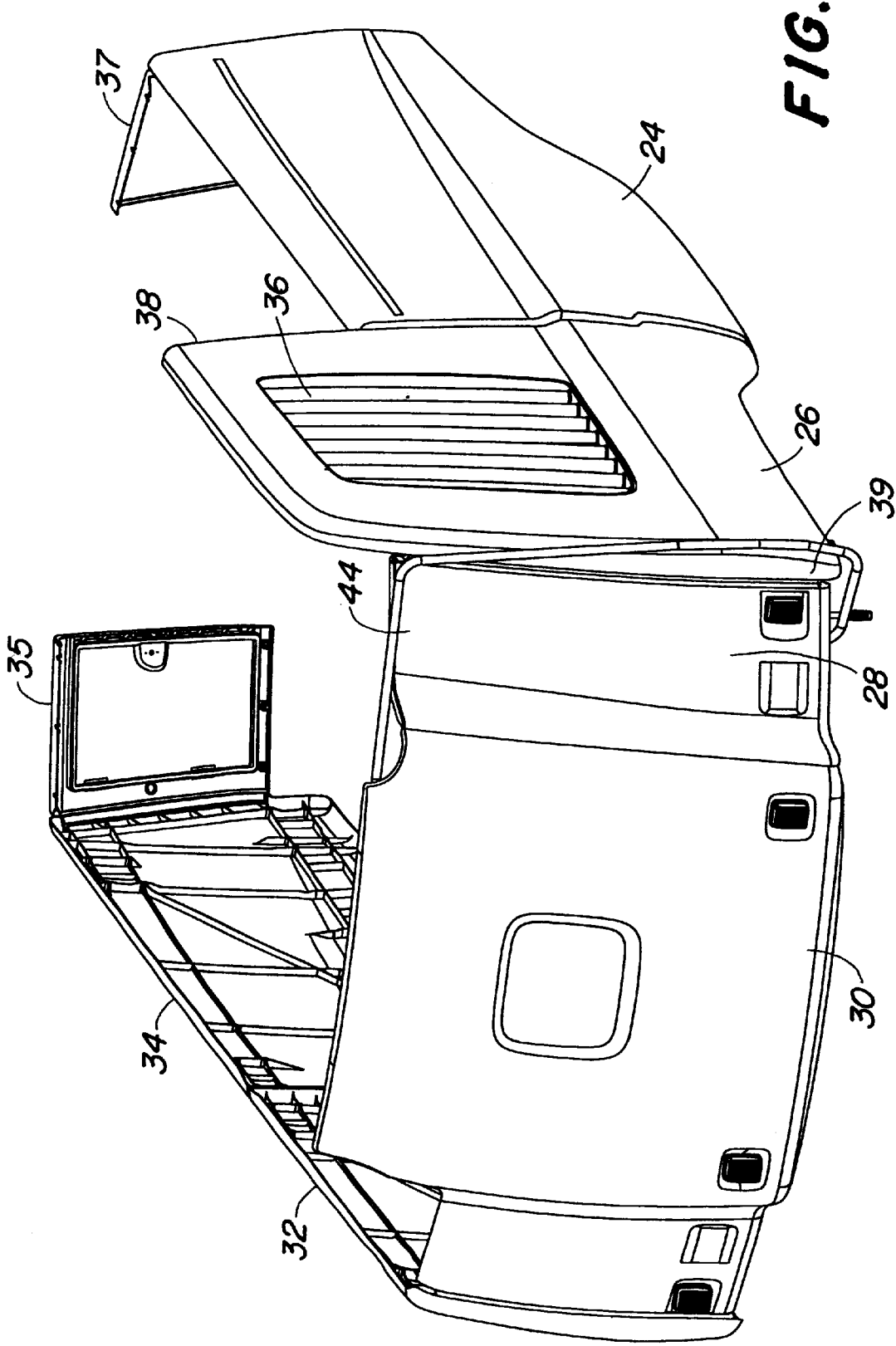
FIG. 2 is a rear corner perspective view of the right side and rear body panels of the combine shown in FIG. 1.
Figure 3:
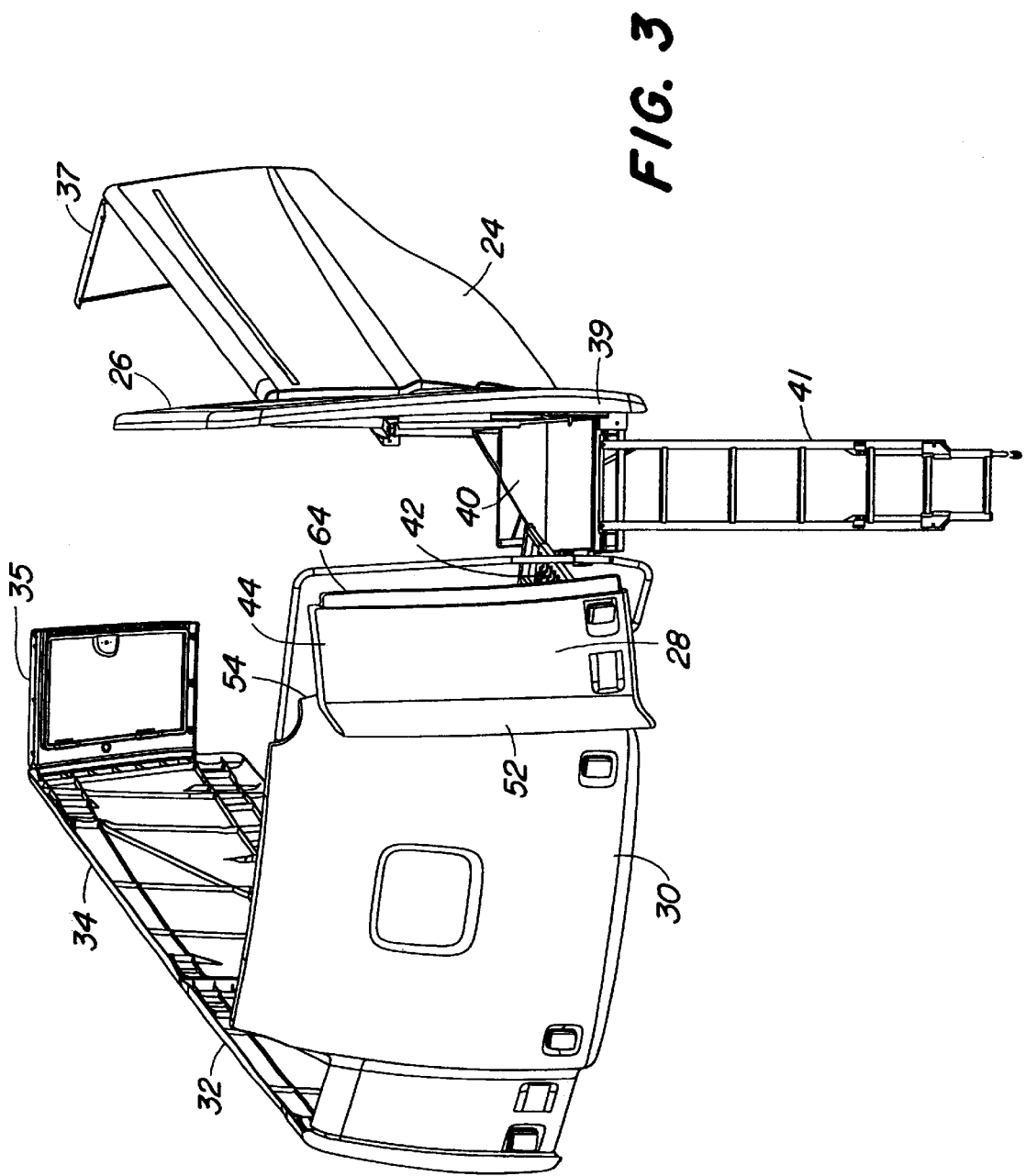
FIG. 3 is a perspective view like FIG. 2 showing the radiator door panel and engine access panel in open positions.

The radiator door panel 26 is movable between a closed position shown in FIGS. 1 and 2 and an open position shown in FIG. 3 by rotation of the door panel about an upright axis adjacent the forward edge 38 of the panel 26. The rear edge 39 of the radiator door panel moves laterally outward to open the panel. The radiator door panel 26 carries a radiator door platform 40 at the lower end thereof. A ladder 41 is stowed below the radiator door platform 40 and can be extended to a lowered use position for climbing to the platform 40. From the platform 40, an operator can step to the engine platform 42.

Figure 4:
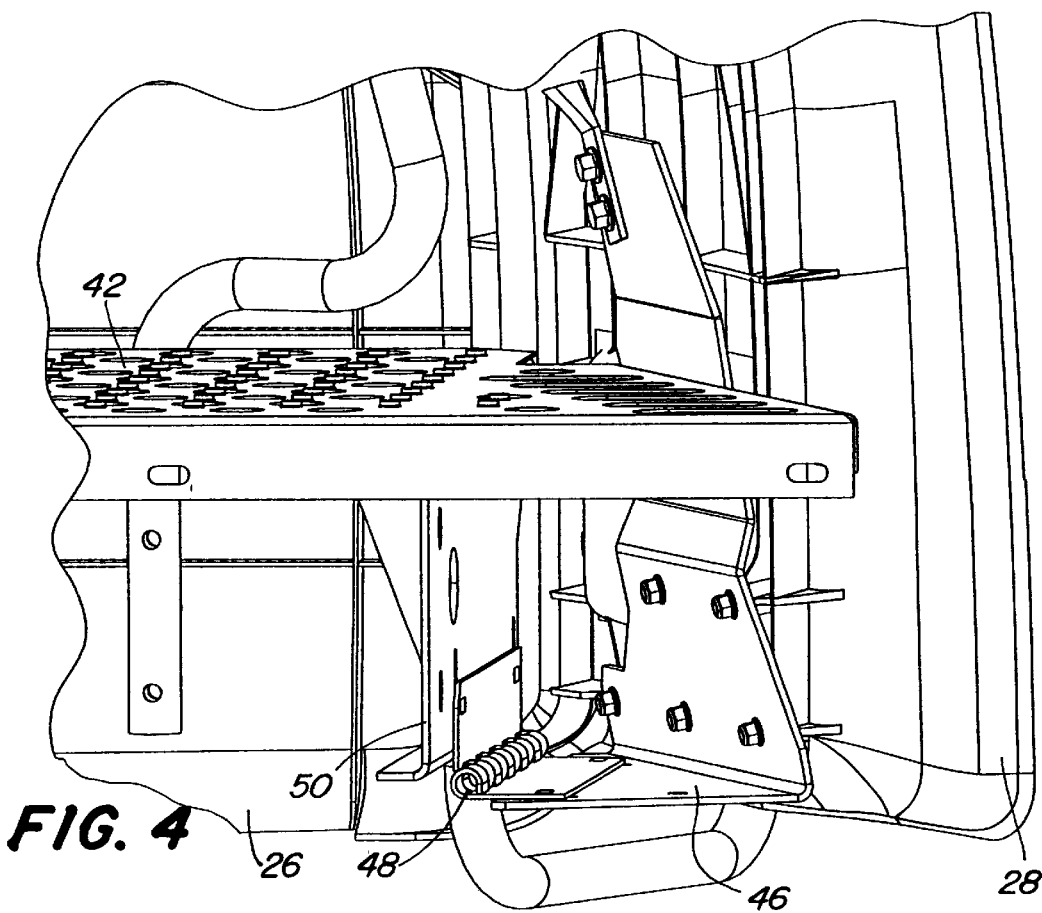
FIG. 4 is a perspective view of the hinge mechanism at the lower end of the engine access panel.
Figure 6:
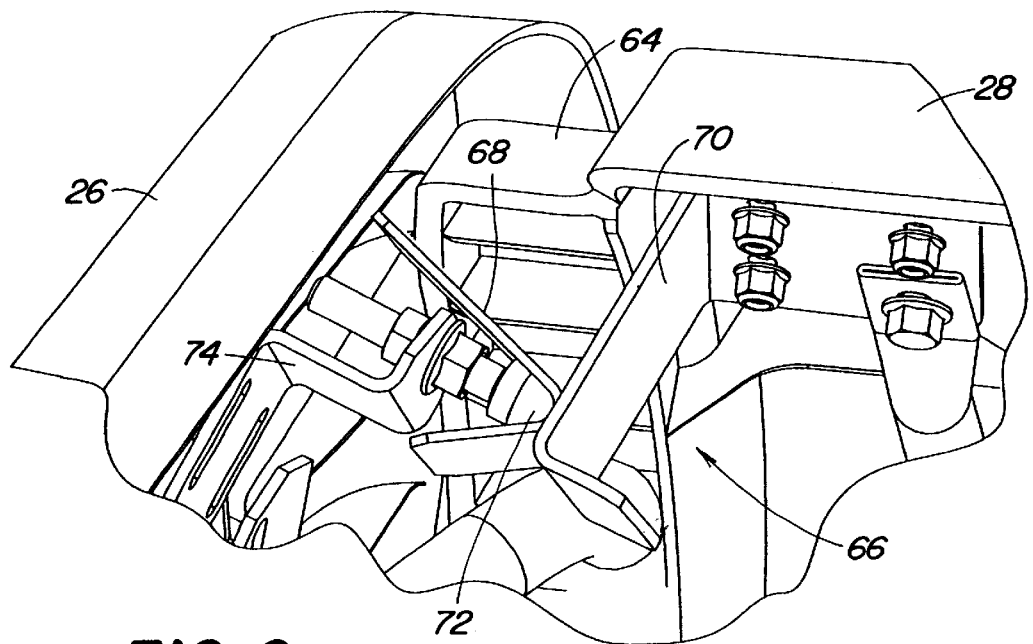
FIG. 6 is a plan view showing the stop between the engine access panel and the radiator door panel.
Figure 5:
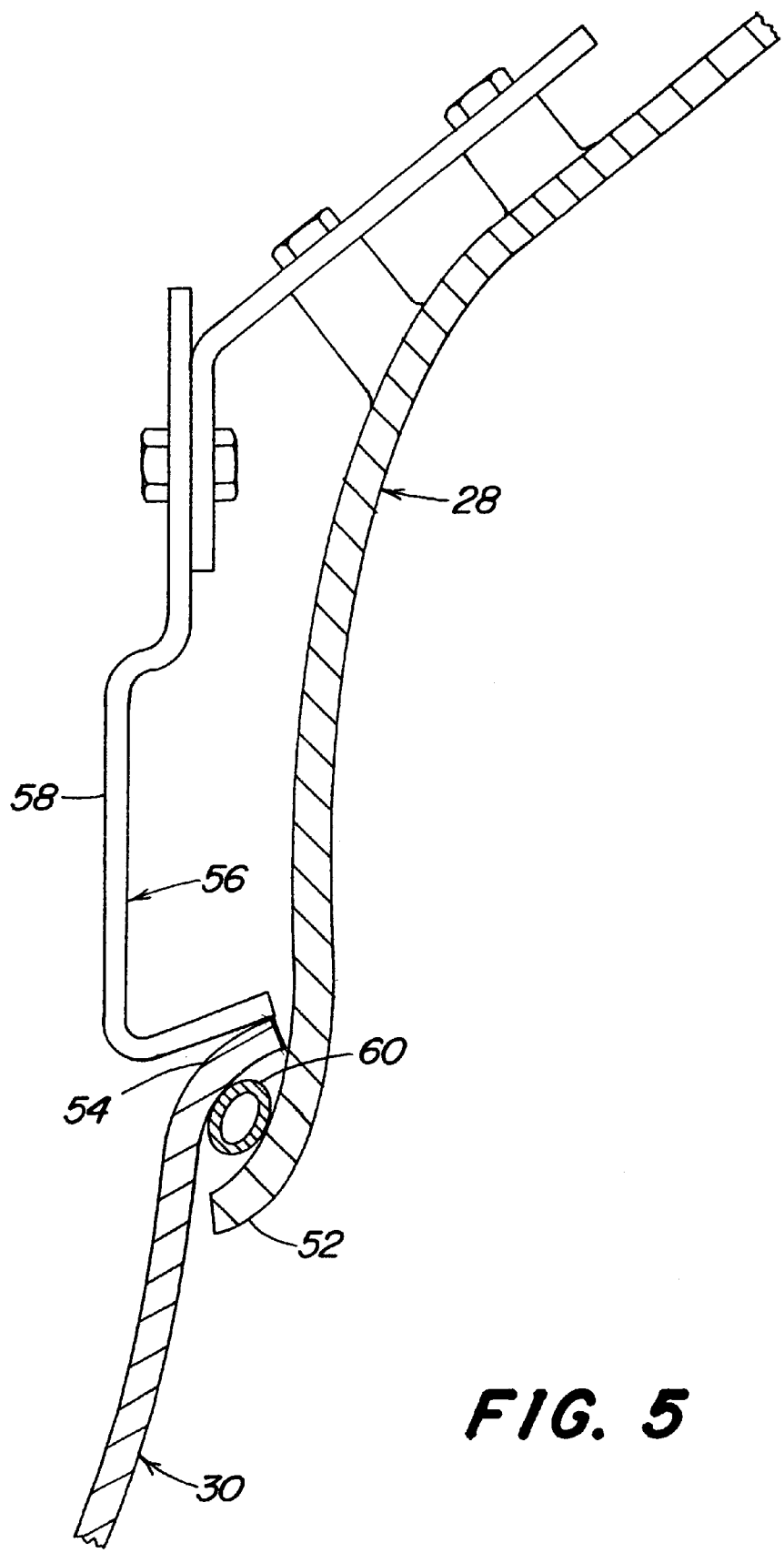
FIG. 5 is a sectional view of the latch clip with the engine access panel in the closed position.

To improve access to the engine platform 42, the engine access panel 28 is rotated about a horizontal axis at its lower end to move the upper end 44 of the engine access panel rearward, as shown in FIG. 3. The panel 28 is mounted to the engine platform 42 at its lower end through a first bracket 46, a hinge 48 and second bracket 50 coupled to the engine platform 42, shown in FIG. 4.

The engine access panel 28 has a first edge portion 52 that overlaps the edge portion 54 of the rear panel 30. The rear panel 30 is stationarily mounted to the combine. When the panel 28 is moved to its closed position, a clip latch 56 and the first edge portion 52 of the panel 28 sandwich the edge portion 54 of the stationary rear panel 30 therebetween. The clip latch 56 has an elongated ramp surface 58 that engages the edge of the rear panel 30 as the engine access panel 28 is moved toward the closed position. As the panel 28 continues to move, the panel 28 deflects away from the rear panel 30, to allow the clip latch to pass the edge 54 of the rear panel. Once the clip latch clears the edge 54, the panel 28 will return to its normal position and sandwich the edge portion 54 of the rear panel therebetween. A weather strip 60 is carried by the engine access panel 28 and seats against the edge portion 54 of the rear panel 30 to prevent dust and dirt from the discharged crop material at the rear of the combine from passing between the panels and into the engine area of the combine.

By sandwiching, or trapping, the edge of the stationary rear panel, the movable panel is held in the closed position. To open the movable panel, the operator pulls the top of the movable panel laterally away from the stationary rear panel to clear the edge of the stationary rear panel. The movable panel is deflected by the inherent flexibility in the panel itself and/or by free play in the hinge structure.

The radiator door panel 26 rear edge 39 that overlaps the second edge portion 64 of the engine access panel to provide a finished appearance to the combine. To properly locate the radiator door panel 26 and the engine access panel 28 relative to one another, a stop mechanism 66 engages when the radiator door panel 26 reaches its closed position. The stop mechanism 66 includes a V-shaped bracket 68 attached to the movable panel 28 by a mounting bracket 70. A conical pin 72 is coupled to the radiator door panel 26 by a mounting bracket 74 and seats in the V-shaped bracket 68. The radiator door panel 26 is latched to the combine frame in the closed position by a latch mechanism (not shown) at the lower end of the radiator door panel 26. When the pin 72 is seated in the V-shaped bracket, the pin secures the opposite edge of the panel 28 and holds it in the closed position.

The panel 28, as well as the other panels 24, 30, 32 and 34, are preferably made of a plastic composite material that allows the panel 28 to deflect as described above to enable the clip latch 56 to move past the edge portion 54 of the stationary rear panel 30. Alternatively, the panel 28 can be relatively stiff and the hinge 48 at the lower end provide sufficient free play for the required deflection of the panel to latch and release from the stationary panel.

With the clip latch of the present invention, the panel 28 can be returned to its closed position solely by manipulation of the panel while standing on the ground. This is accomplished by pushing the lower end of the panel 28 forward, toward the closed position. This avoids the nuisance of having to re-extend the ladder 41 if the operator has already returned the ladder 41 to its stowed position before realizing that the engine access panel is still in the open position. It is not necessary to be at the top of the panel 28 to guide the clip latch 56 past the edge of the stationary rear panel 30.

While the rear panel 30 has been described and claimed as being stationary, it will be appreciated that the panel 30 may be movable but latched into a stationary position before engagement with the movable engine access panel.

The invention should not be limited to the above-described embodiment, but should be limited solely by the claims that follow.

We claim:

1. In a vehicle having multiple body panels including a first upright panel movable between closed and open positions by rotation about an axis adjacent an end of the movable panel and an upright stationary panel adjacent the movable panel, the improvement comprising a clip latch coupled to the movable panel near an end opposite the axis that catches an edge portion of the stationary panel and traps the edge portion of the stationary panel between the clip latch and an overlapping first edge portion of the movable panel upon movement of the movable panel to the closed position, and a second movable panel generally normal to the first movable panel and having a first edge portion overlapping a second edge portion of the first movable panel forming a corner, the second movable panel being movable between open and closed positions and the first movable panel having a stop adjacent the second edge portion thereof engagable by the second movable panel in the closed position to further assist in retaining the first movable panel in the closed position.

2. The vehicle as defined by claim 1 wherein the clip latch has a ramp surface engagable with the stationary panel edge portion to deflect the movable panel away from the stationary panel until the ramp surface has moved beyond the edge portion of the stationary panel.

3. The vehicle as defined by claim 1 wherein the stop includes a V-shaped plate on the first movable panel and a protruding pin on the second movable panel that seats in the V-shaped plate when the first and second movable panels are in the closed positions.

4. The vehicle as defined by claim 1 wherein the first movable panel deflects by bending of the panel.

5. The vehicle as defined by claim 1 wherein the first movable panel deflects by free play in a hinge mechanism by which the first movable panel rotates between open and closed positions.

6. The vehicle as defined by claim 1 wherein the first edge portion of the first movable panel overlaps the edge portion of the stationary panel and the edge portion of the second movable panel overlaps the second edge portion of the first movable panel.

* * * * *